United States Patent [19]

Riesmeier et al.

[11] Patent Number: 4,853,058
[45] Date of Patent: Aug. 1, 1989

[54] APPARATUS AND METHOD FOR ADHERING TAPE TO NONSTRAIGHT WORKPIECE EDGE

[75] Inventors: Wilhelm Riesmeier, Lübbecke; Martin Rose, Espelkamp, both of Fed. Rep. of Germany

[73] Assignee: IMA-Norte Mashinenfabriken Klessmann GmbH & Co., Gutersloh, Fed. Rep. of Germany

[21] Appl. No.: 141,842

[22] Filed: Jan. 11, 1988

[30] Foreign Application Priority Data

Jan. 26, 1987 [DE] Fed. Rep. of Germany ....... 3702154

[51] Int. Cl.⁴ .................... B32B 31/22; B65H 31/00
[52] U.S. Cl. .................... 156/153; 156/391; 156/522; 156/523; 156/577
[58] Field of Search .............. 156/109, 391, 475, 468, 156/486, 522, 526, 539, 574, 577, 107, 461, 463, 479, 153, 154, 256, 353, 523, 297

[56] References Cited

U.S. PATENT DOCUMENTS

| | | | |
|---|---|---|---|
| 2,713,437 | 7/1955 | Broden | 156/486 X |
| 3,574,040 | 4/1971 | Chitwood et al. | 156/468 X |
| 3,733,237 | 5/1973 | Wolff | 156/107 X |
| 3,886,013 | 5/1975 | Bowser et al. | 156/109 |
| 4,118,268 | 10/1978 | Price | 156/510 |
| 4,222,812 | 9/1980 | Duewel | 156/497 |
| 4,230,519 | 10/1980 | DuBroff | 156/468 |
| 4,409,060 | 10/1983 | Janssens | 156/522 X |
| 4,557,783 | 12/1985 | Grone et al. | 156/257 |
| 4,559,001 | 12/1985 | Wiedenhofer et al. | 156/107 X |
| 4,743,336 | 5/1988 | White | 156/522 |

Primary Examiner—David Simmons
Assistant Examiner—David W. Herb
Attorney, Agent, or Firm—Charles E. Baxley

[57] ABSTRACT

An apparatus for adhering a tape to a nonstraight edge of a generally planar workpiece has a stationary workpiece station, clamps retaining the workpiece stationarily in the station, a carriage displaceable adjacent the station parallel to the plane of the workpiece in generally perpendicular longitudinal and transverse directions, and a roller engageable with the workpiece and rotatable on the carriage about an axis generally perpendicular to the workpiece plane. The carriage is displaced in the directions relative to the stationary workpiece to roll the roller around the workpiece edge. A guide feeds a tape from a supply of the tape and an adhesive on the carriage to the roller. The tape is pressed by the roller against the workpiece edge as the roller rolls around the workpiece edge so that the tape is adhered to the workpiece edge.

11 Claims, 5 Drawing Sheets

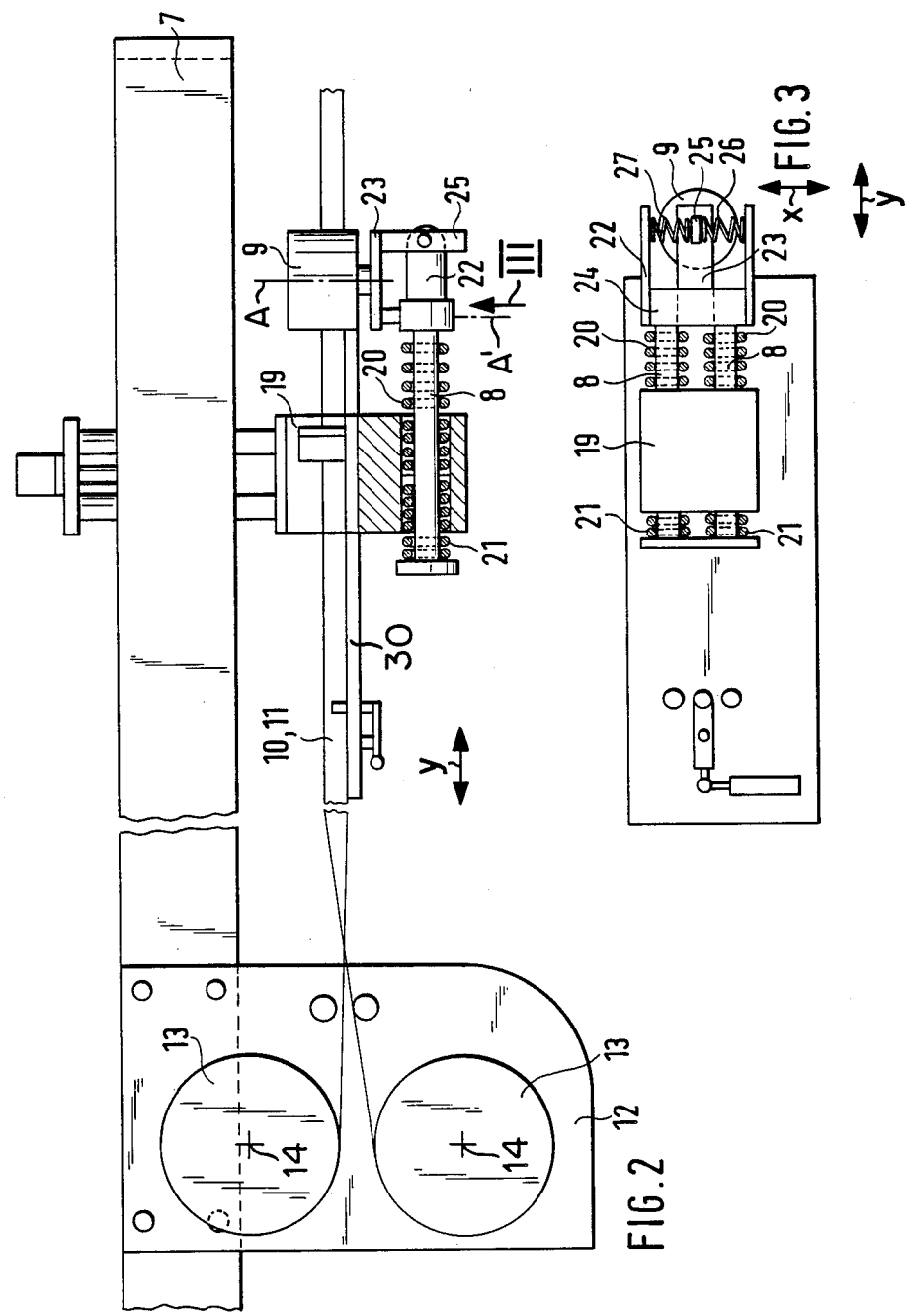

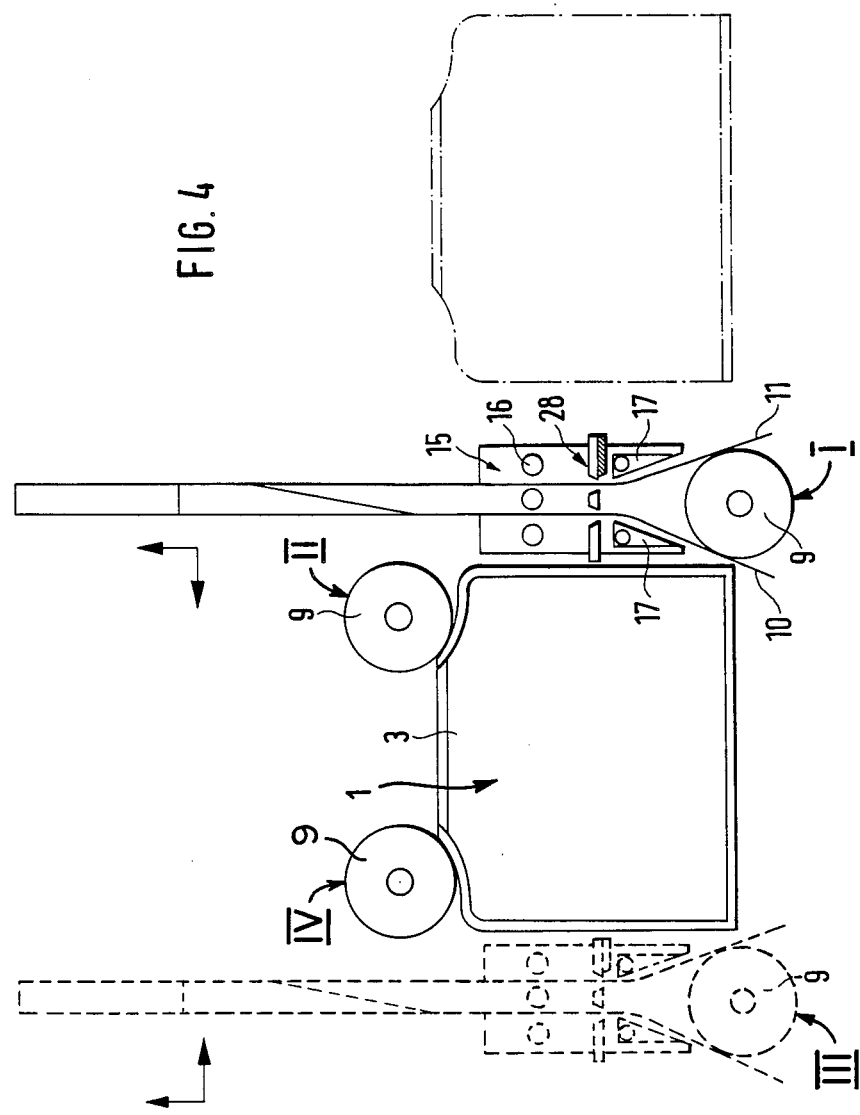

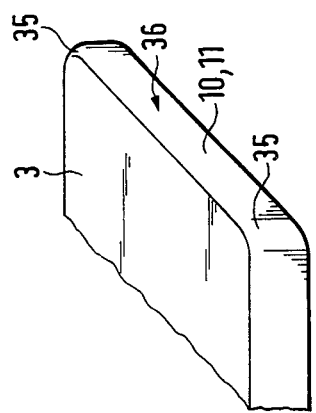
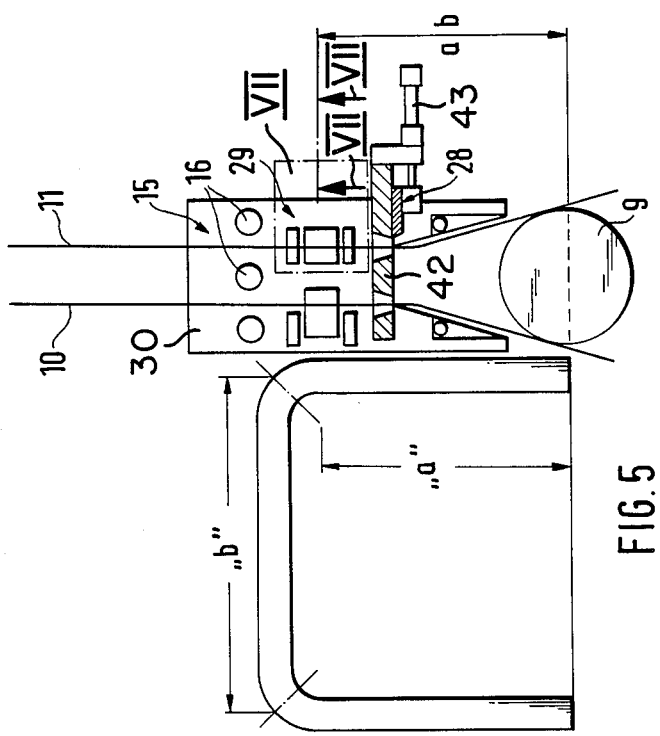

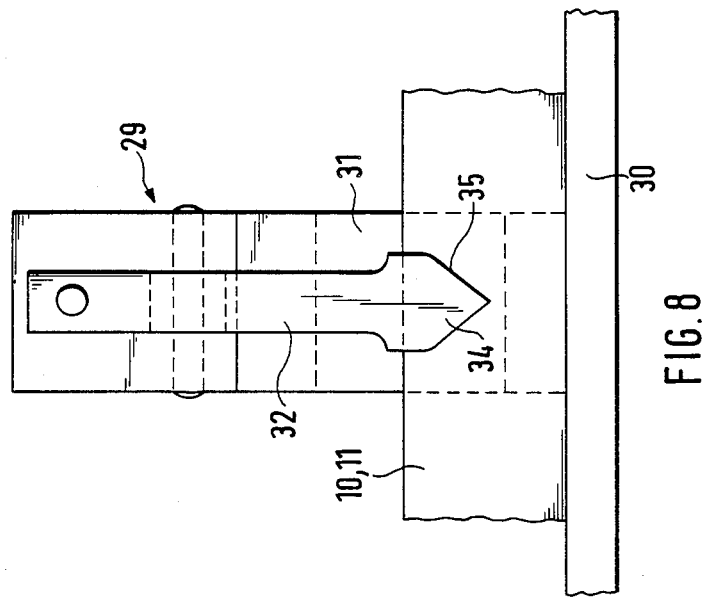
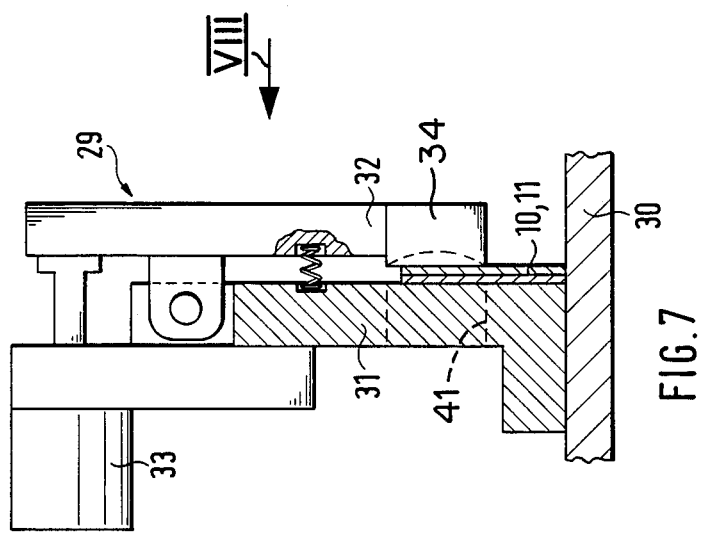

APPARATUS AND METHOD FOR ADHERING TAPE TO NONSTRAIGHT WORKPIECE EDGE

FIELD OF THE INVENTION

The present invention relates to an apparatus for adhering a tape to an irregular workpiece edge. More particularly this invention concerns an apparatus for gluing a tape to the edge of a laminate board and a method of operating the apparatus.

BACKGROUND OF THE INVENTION

In the manufacture of furniture, cabinets, counters, and the like it is standard to adhere a decorative cover tape to the edge of a board. Frequently chipboard or the like is laminated on one of its broad faces with a decorative and/or protective covering or veneer and a tape of a similar such covering is then applied to the board edges to impart the same appearance or properties to them also. As a rule contact or thermally activatable adhesives are used to hold the tape on.

When the workpiece is a board with straight edges, this application of the tape to its edge is easily completed as the workpiece moves along an assembly line in a direction parallel to the edge being taped. The workpiece can be turned to similarly tape its remaining edges. When, however, the workpiece does not have straight edges the task is substantially more difficult.

A standard machine for dealing with such nonstraight edges has a small table to which the workpiece is clamped, normally with the main plane of the workpiece horizontal and the workpiece edges overhanging the table. This table can be rotated about a vertical axis passing through the workpiece. Adjacent the table is an arm having an outer end pivoted about another vertical axis and an inner end carrying a roller with the arm extending generally tangentially of the workpiece. The arm is spring-loaded to press this roller radially inward of the table axis against the workpiece to press an adhesived tape against the workpiece edge while the workpicce rotates. Another such arm upstream in the workpiece rotation direction can carry a tool that mills, grinds, or otherwise machines the workpiece edge, typically to cut back the surface laminate level with the edge.

Such a machine cannot be operated readily by an numerical-type controller because relative to the workpiece that is fixed to the work station, a working plane must be set in which every point must be accessible in two directions. Since the starting position of the workpiece is not determinable and also because the roller arm oscillates, that is moves the roller through an arc intersecting the workpiece edge as the roller follows the workpiece edge, such a controller cannot be used due to the complexity of calculating location based on a nonstraight roller path intersecting an edge of an irregular figure rotating about an indeterminate center.

On the other hand a trimming machine is known which can round edges or cut off projecting laminate by means of a tool that travels around the edge of a stationary workpiece. This machine has a support carrying the tool, typically a roller-type router bit, and movable horizontally in two perpendicular directions to guide this bit around the workpiece. Such a machine typically precedes and is wholly separate from the above-described rotary-table machine for taping the edges of the workpiece after it is trimmed.

OBJECTS OF THE INVENTION

It is therefore an object of the present invention to provide an improved apparatus for adhering a tape to a nonstraight workpiece edge.

Another object is the provision of such an apparatus for adhering a tape to a nonstraight workpiece edge which overcomes the above-given disadvantages, that is which is readily operated by a numerical controller and that accurately applies one or more tapes to a workpiece edge.

Another object is to provide an improved method of operating such a machine to tape a nonstraight workpiece edge.

SUMMARY OF THE INVENTION

An apparatus for adhering a tape to a nonstraight edge of a generally planar workpiece according to the invention has a stationary workpiece station, clamps retaining the workpiece stationarily in the station, a carriage displaceable adjacent the station parallel to the plane of the workpiece in generally perpendicular longitudinal and transverse directions, and a roller engageable with the workpiece and rotatable on the carriage about an axis generally perpendicular to the workpiece plane. The carriage is displaced in the directions relative to the stationary workpiece to roll the roller around the workpiece edge. A guide feeds a tape from a supply of the tape and an adhesive on the carriage to the roller. The tape is pressed by the roller against the workpiece edge as the roller rolls around the workpiece edge so that the tape is adhered to the workpiece edge.

Thus it is possible, by using stops or the like, to accurately establish the workpiece position. In addition since the roller moves in an essentially straight line, it is a simple matter to determine the locus of any position along the workpiece edge. A numeric controller can therefore easily operate the various drives and actuators for fully automatic application of the tape to the workpiece edge. In fact the numeric controller can be of the same type used to custom-shape the edge of a workpiece and the taping device of this invention can actually be constituted as an accessory to such a machine. To this end an edging tool, for instance a rotary bit, can also be mounted on the carriage.

According to another feature of this invention the carriage is mounted on a stationary longitudinal guide and includes a holder longitudinally displaceable on the longitudinal guide. In addition the carriage is transversely displaceable on a transverse guide carried on the carriage.

The supply according to the invention is spaced transversely on the support from the roller and the guide is transversely between the roller and supply. In addition this supply includes at least one spool rotatable about an axis generally parallel to the longitudinal direction and carrying the tape.

The system of this invention also includes a support limitedly transversely displaceable on the carriage and carrying the roller and first springs braced transversely between the support and the carriage for biasing same transversely into a central position from which it is displaceable transversely against the force of the springs. Second springs braced longitudinally between the support and the carriage bias same longitudinally into a central position from which it is displaceable longitudinally against the force of the springs. The carriage is also provided with means for cutting the tape and with means between the supply and the roller for cutting notches out of the tape. The controller operates this cutting means to form the notches at locations on the tape that will be positioned on the corners of the workpiece edge.

The method according to this invention therefore comprises the step of feeding the tape tangentially to the roller and pressing it by means of the roller against the workpiece edge. In addition according to the invention the supply can include two spools of tapes that are fed to diametrally opposite sides of the roller, and this roller is moved in two passes around the workpiece, first applying one of the tapes to the edge and then the other.

DESCRIPTION OF THE DRAWING

The above and other objects, features, and advantages will become more apparent from the following, reference being made to the accompanying drawing in which:

FIG. 2 is large-scale vertical cross section taken along line II—II of FIG. 1;

FIG. 3 is a bottom view taken in the direction of arrow III of FIG. 2;

FIG. 4 is a schematic top view showing the taping station of the machine and illustrating operation of the apparatus according to this invention;

FIG. 5 is another large-scale top view of the taping station of the machine;

FIG. 6 is a perspective view of the corner of a taped workpiece according to this invention;

FIG. 7 is a large-scale sectional view of the detail indicated in the dot-dash box VII of FIG. 5; and FIG. 8 is a side view taken in the direction of arrow VIII of FIG. 7.

SPECIFIC DESCRIPTION

Figure 1:
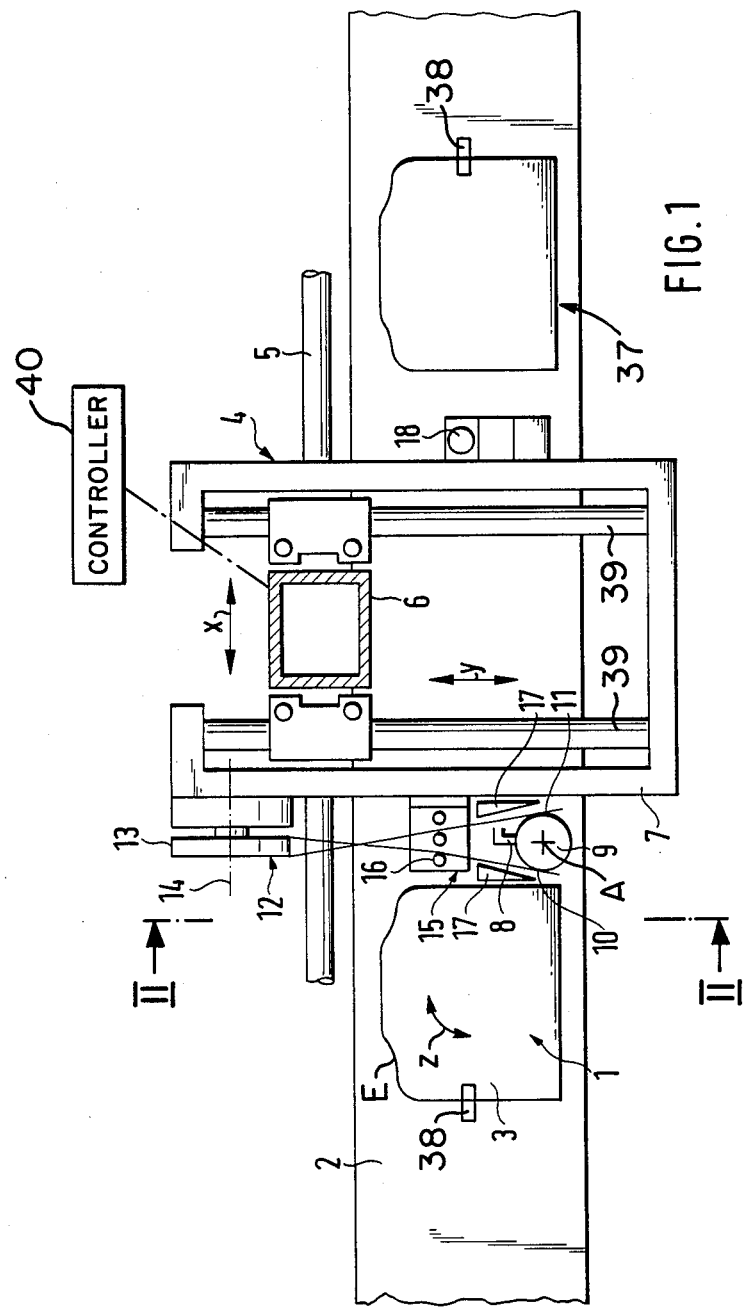
FIG. 1 is a partly diagrammatic top view of the taping apparatus according to this invention.

As seen in FIG. 1 the apparatus of this invention has a table 2 defining a taping station 1 and, offset therefrom in a longitudinal direction x, an edging station 37. Workpieces 3 are secured by clamps illustrated schematically at 38 in these stations 1 and 37 against any movement, with the planes of the workpieces 3 horizontal. Each workpiece 3 has an edge E which has at least one nonstraight portion and which is rounded or chamfered as shown at 36 as seen in FIG. 6.

An edging roller 9 rotatable about an upright axis A is carried on an outrigger 7 of a carriage 6 forming a support 4 with this outrigger 7. This roller 9 can move in the horizontal longitudinal direction x and in a horizontal transverse direction y perpendicular thereto, to track around the workpiece edge E. To this end the carriage 6 can move longitudinally on fixed longitudinal guide bars 5 and the outrigger 7 has transverse guide rails 39 that slide in the direction y in the carriage 6. It is also possible to make the mast of the carriage 6 vertically displaceable to accommodate workpieces 3 of different thicknesses. In this arrangement the side of the outrigger 7 opposite the roller 9 carries an edging tool 18 that can trim the edges of the workpiece 3 in the station 37. Movement of the outrigger 7 and carriage 6 is controlled by a numeric controller 40 provided with appropriate servomotors.

The roller 9 is mounted on the outrigger 7 for limited movement in the directions x and y with, however, the roller axis A always perfectly perpendicular to a horizontal plane defined by these directions x and y. As seen best in FIGS. 2 and 3 to this end the outrigger 7 carries a depending mounting block 19 in which two support arms 8 are slidable in the direction y. Each such arm or rod 8 has two springs 20 braced oppositely in the direction y on the block 19. The outer (right-hand in FIGS. 2 and 3) ends of the rods 8 are fixed to the back end 24 of a fork 22 on which a roller support 23 is pivotal about an axis A' parallel to the axis A and perpendicular to the horizontal workpiece plane. This support 23 carries the pivot for the roller 9 and has a depending tongue 25 extending down between the arms of the fork 22 and braced by springs 26 compressed in the direction x thereagainst. Thus the roller 9 can move limitedly in the direction y by compression of one or the other of the springs 20 and 21 with sliding of the arms 8 in the block 19. In addition it can move limitedly in the direction x relative to the block 19 by pivoting of the support 23 about the axis A', with compression of one or the other of the springs 26 and 27. The use of two arms 8 prevents, however, any canting of the axis A relative to the vertical, that is to a position not perpendicular to the workpiece 3. Thus the cylindrical outer surface of the roller 9 will always be perfectly vertical.

The carriage 7 also carries a pair of supply spools 13 rotatable about vertically spaced axes 14 extending in the direction x and carrying respective tapes 10 and 11 that are to be glued to the edge E of the workpiece 3 in the station 1. The carriage 7 carries, offset in the direction y toward the roller 9 from the supply spools 13, a support plate 30 carrying three upright guide rollers 16 between which the two tapes 10 and 11 are twisted so as to lie in vertical planes and extending mainly in the direction y thereafter to where they tangent diametrically opposite sides of the roller 9. Between the deflecting guide rollers 16 and the roller 9 each tape 10 and 11 passes first through a notching device 29, then through a cutter 28, and finally over a blower-type heater 17.

The notching device 29 as shown in FIGS. 7 and 8 comprises a die 31 mounted on the base plate 30 and formed with a hole 41 into which can enter the head 34 of a rocker/punch 32 operable by an actuator 33 itself operated by the controller 40 as will be described below. The tapes 10 and 11 pass between the punch 34 and die 31 such that a triangular notch 35 can be cut out of them. These notches 35 are positioned in the tapes 10 and/or 11 such that as also shown in FIG. 6 when the tapes 10 and/or 11 are applied to the workpiece edge E the notches 35 will be able to close at the rounded corners. Otherwise the tapes 10 and/or 11 would bunch up at these locations.

The cutter 28 comprises a simple transversely displaceable blade 42 cooperating with another not-illustrated blade and operated by an actuator 43 itself operated by the controller 40.

The heater 17 heats a layer of thermally activatable adhesive carried on the tapes 10 and 11. FIG. 5 illustrates how these heaters 17 heat the faces of the tapes 10 and 11 that are turned away from the roller 9 and do not engage same, and it is of course these faces that carry the adhesive, so that the roller 9 is not fouled and does not stick to them.

The controller 40 also monitors how much of the tapes 10 and 11 is fed out, for instance by tracking the angular position of the roller 9. Thus as seen in FIG. 4 the controller 40 first moves the carriage 7 such that the roller 9 is as at the positioned indicated at I at the near right-hand corner of the workpiece 3, with the tape 10 pressed against its edge E. The carriage 7 then is moved away and back to the position II, thereby tracking it around the nonstraight edge and pressing the tape 10 against and in fact adhering it to this edge E. The cutter 28 is operated at the appropriate instant to sever the tape 10 so that it also ends at the end of the edge being taped.

Then the roller is moved to the position shown at III and is tracked to position IV, pressing the opposite tape 11 against the other nonstraight edge portion like the tape 10.

When the workpiece 3 is rectangular with rounded corners as shown in FIG. 5 the distances a and b between the centers of adjacent ends and/or corners are stored in the controller 40 which actuates the punch 29 accordingly to form the notches 35. In addition the tapes 10 and 11 are payed out such that they fall just at these corners. In this arrangement it would be possible to work with a single tape which would be wound all around the workpiece 3, if desired.

It would also be possible to provide the table or support surface 2 with a turntable defining the taping station 1. The workpiece would be secured to this table such that the roller 9 could be held against its edge E. The workpiece can be rotated past the limitedly moveable roller 9 and moved as indicated by arrow z through 90° or 180° between consecutive taping operations to eliminate the need to establish two starting points such as at positions I and III of FIG. 4 for the roller 9.

We claim:

1. An apparatus for custom shaping and adhering an adhesived tape to a nonstraight edge of a generally planar workpiece, the apparatus comprising:
   a stationary workpiece taping station;
   a stationary workpiece edging station adjacent the taping station;
   means for retaining a workpiece stationary in each of the stations in a generally horizontal position with its edges upright;
   a carriage displaceable adjacent the stations parallel to the planes of the workpieces and relative to the workpieces in horizontal and generally perpendicular longitudinal and transverse directions;
   an edging tool carried on the carriage and engageable with the workpiece in the edging station;
   a roller engageable with the workpiece in the taping station and rotatable on the carriage about an upright axis generally perpendicular to the workpiece planes;
   means for displacing the carriage in the directions relative to the stationary workpiece to roll the roller around the workpiece edge in the taping station and to move the edging tool around the workpiece edge in the edging station to custom shape this edge;
   a supply of the adhesived tape on the carriage;
   means including a guide for feeding the tape from the supply to the roller; and
   control means for pressing the tape by the roller against the workpiece edge in the taping station as the roller rolls around the workpiece edge, whereby the tape is adhered to the workpiece edge.

2. The apparatus defined in claim 1 wherein the displacing means includes
   a stationary longitudinal guide,
   a holder longitudinally displaceable on the longitudinal guide, and
   a transverse guide carried on the carriage, the carriage being transversely displaceable on the transverse guide.

3. The apparatus defined in claim 1 wherein the supply is spaced transversely on the carriage from the roller and the guide is transversely between the roller and supply.

4. The apparatus defined in claim 3 wherein the supply includes at least one spool rotatable about an axis generally parallel to the longitudinal direction and carrying the tape.

5. The apparatus defined in claim 1, further 2. comprising:
   a support limitedly transversely displaceable on the carriage and carrying the roller;
   first springs braced transversely between the support and the carriage for biasing same transversely into a central position from which it is displaceable transversely against the force of the springs.

6. The apparatus defined in claim 5, further 2. comprising
   second springs braced longitudinally between the support and the carriage for biasing same longitudinally into a central position from which it is displaceable longitudinally against the force of the springs.

7. The apparatus defined in claim 1, further comprising
   means on the carriage between the supply and the roller for cutting the tape.

8. The apparatus defined in claim 1, further comprising
   means on the carriage between the supply and the roller for cutting notches out of the tape, the control means operating this cutting means to form the notches at locations on the tape that will be positioned on the corners of the workpiece edge.

9. The apparatus defined in claim 8 herein the cutting means includes a die and a punch engageable through the tape with the die.

10. A method of custom shaping and adhering an adhesived tape to a nonstraight edge of a generally planar workpiece with an apparatus comprising:
    a stationary workpiece taping station;
    a stationary edging station adjacent the taping station;
    means for retaining a workpiece stationary in each of the stations in a generally horizontal position;
    a carriage displaceable adjacent the stations parallel to the planes of the workpieces and relation to the workpieces in horizontal and generally perpendicular longitudinal and transverse directions;
    an edging tool on the carriage engageable with the workpiece in the edging station;
    a roller engageable with the workpiece in the taping station and rotatable on the carriage about an upright axis generally perpendicular to the workpiece planes; and
    a supply of the adhesived tape on the carriage;
    the method comprising the steps of:
    displacing the carriage in the longitudinal and transverse directions relative to the stationary workpiece in the edging station with the edging tool engaging the edge of the workpiece in the edging station to shape same;
    displacing the carriage in the longitudinal and transverse directions relative to the stationary workpiece in the taping station to roll the roller around the workpiece edge;

feeding the tape from the supply tangentially to the roller; and pressing the tape by the roller against the workpiece edge as the roller rolls around the workpiece edge in the taping station, whereby the tape is adhered to the workpiece edge.

11. The method as defined in claim 10 wherein the supply includes two spools each carrying a respective such tape and the tapes are fed to diametrally opposite sides of the roller, the carriage being displaced in two passes on opposite sides against the edge and the roller is urged oppositely on each pass so that with one pass one of the tapes is applied to the respective portion of the workpiece edge and with the next pass the other tape is applied to the opposite portion.

* * * * *